Patented Sept. 10, 1940

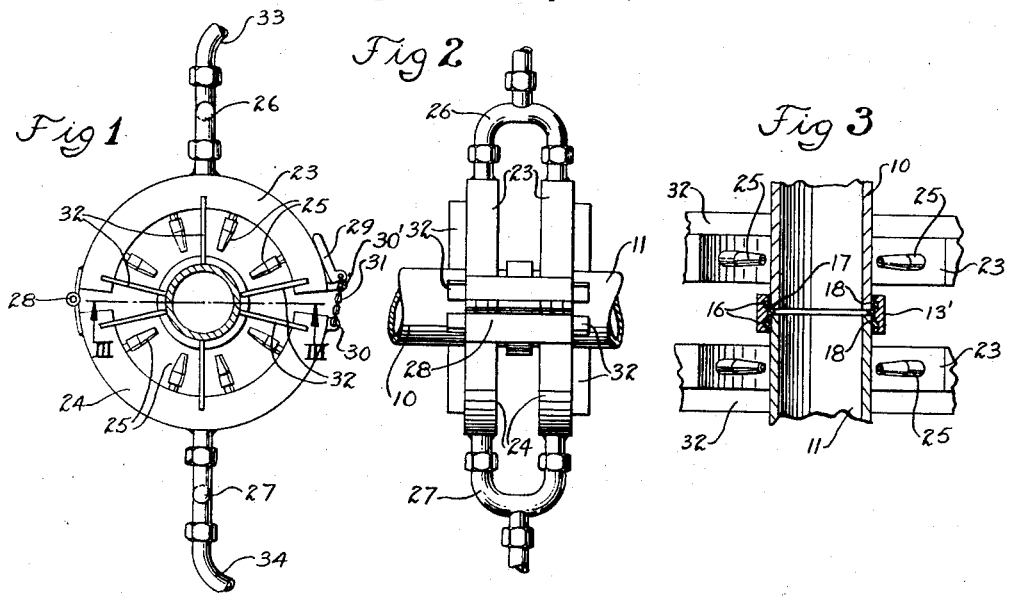

2,214,031

UNITED STATES PATENT OFFICE 2,214,031

APPARATUS FOR JOINING METAL MEMBERS

Harry E. Rockefeller, New York, N. Y., assignor, by mesne assignments, to Union Carbide and Carbon Corporation, a corporation of New York Original application September 20, 1934, Serial No. 744,751. Divided and this application September 30, 1938, Serial No. 232,564

4 Claims. (Cl. 263—5)

This invention relates to apparatus for joining metals.

Metal members are generally joined by welding in which a welding rod is fused and deposited between the contiguous edges of the members which have been heated to a welding temperature. To insure firm and sound welded joints that are produced in this manner, the operator or welder usually is a person who has acquired welding skill and good technique. In many instances, however, it is desired to join metals without the need of a skilled welder. One such instance is the joining of pipe sections in heating and water systems. It is highly desirable to join such pipe sections without resorting to welding, as above-described, or to the necessity of threading pipe sections and providing threaded plumbing fittings.

The primary object of this invention is to provide apparatus for effectively carrying out in practice the improved method of joining metals disclosed and claimed in my copending application Serial No. 744,751, filed September 20, 1934, now Patent No. 2,151,334 entitled "Method of joining metal members," of which this application is a division.

In accordance with the invention, there is provided apparatus for heating conduits arranged to be joined by capillary bonding, comprising the combination of two pairs of manifold blocks of semi-circular shape adapted to be connected to a source of gaseous fuel; the blocks normally being arranged with the ends of one pair disposed adjacent the ends of the other pair to form two ring burners; means associated with the blocks for producing inwardly directed heating flames; means for maintaining the blocks forming one ring in spaced and substantially parallel relation with the blocks forming the other ring, the last-named means including hinge means pivotally connecting the ends of one pair of said blocks and connecting together the blocks of each pair; and means for clamping the blocks in position at a joint between conduits.

In accordance with the invention there is also provided, in heating apparatus, in combination; two arcuate manifold blocks adapted to be connected to a source of fuel; means providing outlets from the blocks for fuel, the outlets being adapted to discharge fuel inwardly from the blocks; and means rigidly connecting together the two blocks in spaced parallel relation, the last-named means comprising a plurality of connecting members spaced apart a substantial distance whereby the space between the blocks is kept open for observation of a heating operation, at least one of the connecting members comprising a gas supply conduit rigidly secured to each block.

The primary object as well as other objects and advantages of this invention will become apparent as the following description proceeds, having reference to the accompanying drawing, in which:

Fig. 1 is a side view of a double-ring burner for effectively joining pipe sections in accordance with my improved method, the burner being disposed about and adjacent a joint to be formed between the abutting ends of two pipes;

Fig. 2 is a rear view of the double-ring burner illustrated in Fig. 1; and

Fig. 3 is a sectional view taken at line 3—3 of Fig. 1 illustrating one manner in which a joint can be prepared and the pipe sections united in accordance with the method of the application of which this is a division.

In accordance with the present invention, an improved and simplified apparatus is provided for performing the method of joining metal members or parts in which metal is inserted adjacent the surfaces of the metal members arranged to be joined, the inserted metal having a fusion point lower than that of the metal members, and heat is then applied indirectly to the inserted metal by conduction through one or both of the metal members, as the case may be, in such a manner and with sufficient intensity to cause the inserted metal to melt or fuse and upon solidification unite the metal members together.

In the drawing is illustrated in detail the apparatus of the present invention, as well as one of several ways in which a joint can be formed by the use of the improved apparatus. In such a joint, as shown in Fig. 3, a ferrule 13' may be provided with two annular recesses 16 filled with metal 17 having a fusion point lower than that of the ferrule 13' and the conduits 10 and 11. Heat is applied by the apparatus of the invention on portions of the peripheral surfaces of the conduits which are spaced from the extreme ends thereof, and this heat is conducted longitudinally of the conduits to cause melting or fusion of the metal 17 so that it will flow between the contacting surfaces of the ferrule and the conduits, as indicated at 18, and upon solidification unite the conduits 10 and 11 together.

The foregoing method has been successfully employed in joining iron and steel members. In joining steel members the metal arranged adjacent the contacting surfaces of the members and having a lower fusion point than the members may be an alloy of copper, such as bronze. In using bronze, sufficient heat is applied on a steel member at a suitable distance from the joint so that the steel surfaces adjacent the bronze will reach a temperature of at least about 1620° F. At this temperature the bronze will commence to fuse and flow between the heated contacting surfaces of the members. By heating the bronze indirectly by conduction through both of the steel members it will be quite evident that the adjacent surfaces of the steel members will always be at an elevated temperature at the time the bronze commences to melt, and while it is melting or fusing. In this manner the bronze will melt and effectively tin the contacting surfaces of the members to be joined and insure a firm and sound joint.

To make certain that the contacting surfaces of the steel members to be joined are clean so that the bronze will properly tin thereon, a suitable flux is employed. The bronze metal and contacting surfaces of the steel members may be painted or coated with the flux in any convenient manner. In joining conduits, for example, the ends of the conduits may be dipped into the flux. A flux which may be used in joining steel members comprises a mixture of borax and boric acid.

In Figs. 1, 2 and 3 I have shown one embodiment of my invention comprising a double ring burner disposed about the abutting ends of conduits 10 and 11. This burner comprises a plurality of hollow manifold blocks 23 and 24 of semi-circular shape arranged to form a double ring with the ends thereof disposed adjacent to each other. Nozzles 25, extending radially inward, are secured to the manifold blocks in spaced relation to direct heating flames over the entire peripheral surfaces of the conduits at portions thereof spaced from the extreme ends of the conduits.

Each pair of manifold blocks 23 and 24 is maintained in spaced and parallel relation by U-shaped conduits 26 and 27, respectively, the ends of which are secured, as by welding, to the manifold blocks intermediate the ends thereof; by a hinge member 28 extending between each pair of manifold blocks and secured to adjacent and opposing ends thereof; and by members 30 and 30' connected across the ends of the manifold blocks 23 and 24, respectively, opposite to those to which the hinge member 28 is secured. When the manifold blocks are disposed about the ends of the aligned conduits, the ends of the manifold blocks to which the members 30 and 30' are secured may be clamped together in any suitable manner, as by a chain 31 having a clamping lever 29'.

To maintain the manifold blocks 23 and 24 in an operating position on the conduits 10 and 11 with the tips of the nozzles 25 spaced from the conduits, clamping plates 32 are provided. These plates 32 are secured to the outer sides of the manifold blocks, extend radially inward, and the inner ends thereof are adapted to contact the conduits. It will thus be seen that, when the manifold blocks 23 and 24 are clamped in position on the conduits 10 and 11, as shown in Fig. 2, heat will be applied about the entire peripheral surface of the conduits in the minimum length of time and with little effort on the part of an operator. The U-shaped conduits 26 and 27 may be connected through flexible conduits 33 and 34 to a source of supply of combustible gas (not shown).

While I have shown a particular embodiment of my invention, it will be apparent that modifications may be made without departing from the spirit and scope thereof as set forth in the claims.

I claim:

1. In heating apparatus, in combination; two arcuate manifold blocks adapted to be connected to a source of fuel; means providing outlets from said blocks for fuel, said outlets being adapted to discharge fuel inwardly from said blocks; and means rigidly connecting together said two blocks in spaced parallel relation, said last-named means comprising a plurality of connecting members spaced apart a substantial distance whereby the space between said blocks is kept open for observation of a heating operation, at least one of said connecting members comprising a gas supply conduit rigidly secured to each block.

2. Apparatus for heating conduits arranged to be joined by capillary bonding, comprising the combination of two pairs of manifold blocks of semi-circular shape adapted to be connected to a source of gaseous fuel; said blocks normally being arranged with the ends of one pair disposed adjacent the ends of the other pair to form two ring burners; means associated with said blocks for producing inwardly directed heating flames; means for maintaining said blocks forming one ring in spaced and substantially parallel relation with said blocks forming the other ring, said last-named means including hinge means pivotally connecting the ends of one pair of said blocks and the ends of the other pair of said blocks adjacent thereto and connecting together the blocks of each pair, and means for clamping said blocks in position at a point between conduits.

3. Heating apparatus comprising, in combination, two pairs of manifold blocks of substantially semi-circular shape adapted to be connected to a source of fuel, said blocks normally being arranged with the ends of one pair disposed adjacent to the ends of the other pair to form two ring burners; means providing outlets from said blocks for fuel, said outlets being adapted to discharge fuel inwardly from said ring burners; hinge means pivotally connecting an end of each block of one pair with the adjacent end of a block of the other pair, said hinge means also rigidly connecting together the blocks of each pair for maintaining the blocks forming one ring in spaced and substantially parallel relation with the blocks forming the other ring; additional connecting members rigidly connecting together the blocks of each pair, said members being spaced apart a substantial distance whereby the space between said two rings is kept open for observation of a heating operation, at least one connecting member for each pair of blocks comprising a gas supply conduit rigidly secured to both blocks of such pair.

4. Heating apparatus comprising, in combination, two pairs of manifold blocks of substantially semi-circular shape adapted to be connected to a source of fuel, said blocks normally being arranged with the ends of one pair disposed adjacent to the ends of the other pair to form two ring burners; means providing outlets from said blocks for fuel, said outlets being adapted to discharge fuel inwardly from said ring burners; hinge means pivotally connecting an end of each block of one pair with the adjacent end of a block of the other pair, said hinge means also rigidly connecting together the blocks of each pair for maintaining the blocks forming one ring in spaced and substantially parallel relation with the blocks forming the other ring; additional connecting members rigidly connecting together the blocks of each pair, said members being spaced apart a substantial distance whereby the space between said two rings is kept open for observation of a heating operation, at least one connecting member for each pair of blocks comprising a gas supply conduit rigidly secured to both blocks of such pair; and a plurality of clamping plates secured to the other side of each block and extending inwardly therefrom, said plates being adapted to contact a workpiece to be heated to maintain said ring burners firmly in position with said outlets substantially equally spaced from the workpiece.

HARRY E. ROCKEFELLER.